(12) United States Patent
Prest et al.

(10) Patent No.: US 12,445,416 B2
(45) Date of Patent: Oct. 14, 2025

(54) METHODS AND SYSTEMS FOR COMPRESSED ENCRYPTION

(71) Applicant: PQShield Ltd, Oxford (GB)

(72) Inventors: Thomas Prest, Oxford (GB); Shuichi Katsumata, Tokyo (JP); Kris Kwiatkowski, Oxford (GB)

(73) Assignee: PQShield Ltd., Oxford (GB)

( * ) Notice: Subject to any disclaimer, the term of this patent is extended or adjusted under 35 U.S.C. 154(b) by 353 days.

(21) Appl. No.: 17/937,969

(22) Filed: Oct. 4, 2022

(65) Prior Publication Data

US 2023/0224281 A1    Jul. 13, 2023

Related U.S. Application Data

(63) Continuation of application No. PCT/GB2021/050838, filed on Apr. 6, 2021.

(30) Foreign Application Priority Data

Apr. 8, 2020   (GB) ..................................... 2005237

(51) Int. Cl.
  *H04L 9/40*   (2022.01)
  *H04L 9/08*   (2006.01)
  *H04L 9/30*   (2006.01)

(52) U.S. Cl.
  CPC ........ *H04L 63/0428* (2013.01); *H04L 9/0869* (2013.01); *H04L 9/30* (2013.01)

(58) Field of Classification Search
  CPC ..... H04L 63/0428; H04L 9/0869; H04L 9/30; H04L 2209/42; H04L 9/0836; H04L 9/0841; H04L 9/3013; H04L 9/3066; H04L 9/3093; H04L 9/0833
  See application file for complete search history.

(56) References Cited

U.S. PATENT DOCUMENTS

| | | | |
|---|---|---|---|
| 11,635,952 B2 | 4/2023 | Katsumata et al. | |
| 2007/0118746 A1 | 5/2007 | Lauter et al. | |
| 2008/0301448 A1 | 12/2008 | Charles et al. | |
| 2011/0191764 A1 | 8/2011 | Piorecki | |
| 2012/0039465 A1* | 2/2012 | Gentry ................. | H04L 9/0816 380/44 |

(Continued)

FOREIGN PATENT DOCUMENTS

| | | |
|---|---|---|
| WO | WO-2021205154 A1 | 10/2021 |
| WO | WO-2021240157 A1 | 12/2021 |
| WO | WO-2022129898 A1 | 6/2022 |

OTHER PUBLICATIONS

Alagic, G. et al. Status Report on the First Round of the NIST Post-Quantum Cryptography Standardization Process, NIST Interagency/Internal Report (NISTIR), National Institute of Standards and Technology (2019).

(Continued)

*Primary Examiner* — Hany S. Gadalla
(74) *Attorney, Agent, or Firm* — EIP US LLP

(57) ABSTRACT

Disclosed herein are method and systems for transmitting a plurality of ciphertexts to a plurality of users. The systems and methods described herein provide for performing an encryption update comprising a plurality of encryption keys and a multi-ciphertext to a plurality of recipient nodes. Methods and systems for organizing a database are also disclosed herein.

13 Claims, 12 Drawing Sheets

(56) References Cited

U.S. PATENT DOCUMENTS

| | | | |
|---|---|---|---|
| 2012/0155635 A1* | 6/2012 | Vaikuntanathan | H04L 9/0894 380/44 |
| 2012/0213359 A1* | 8/2012 | Troncoso Pastoriza | H04L 9/008 380/28 |
| 2013/0326224 A1 | 12/2013 | Yavuz | |
| 2013/0346755 A1 | 12/2013 | Nguyen et al. | |
| 2015/0227930 A1* | 8/2015 | Quigley | H04L 9/3013 705/72 |
| 2015/0270957 A1* | 9/2015 | Uzun | H04L 63/062 713/168 |
| 2015/0270964 A1* | 9/2015 | Yasuda | H04L 9/0825 713/171 |
| 2020/0177366 A1* | 6/2020 | Han | H04L 9/3239 |
| 2022/0029783 A1* | 1/2022 | Cheon | G06F 17/16 |

OTHER PUBLICATIONS

Albrecht, Martin R. et al. On the concrete hardness of Learning with Errors. Journal of Mathematical Cryptology 9 (2015): 169-203.

Bhargavan, Karthikeyan et al. Formal Models and Verified Protocols for Group Messaging: Attacks and Proofs for IETF MLS. (2019).

Castryck, Wouter et al. CSIDH: An Efficient Post-Quantum Commutative Group Action. IACR Cryptol. (2018): 383.

Cheng, Haitao et. al. CCA Secure Multi-recipient KEM from LPN. ICICS (2018).

Co-pending U.S. Appl. No. 18/059,027, inventor Howe; James, filed Nov. 28, 2022.

Gentry, Craig et al. Trapdoors for hard lattices and new cryptographic constructions. In Proceedings of the fortieth annual ACM symposium on Theory of computing (STOC '08). Association for Computing Machinery, New York, NY, USA (2008): 197-206. https://doi.org/10.1145/1374376.1374407.

Gilles, Barthe et al. GALACTICS: Gaussian Sampling for Lattice-Based Constant-Time Implementation of Cryptographic Signatures, Revisited. IACR, vol. 20190520:130221 (2019): 1-26.

Gilles, Barthe et al. Masking the GLP Lattice-Based Signature Scheme at Any Order. IACR, vol. 20181017:145402 (2018): 1-51.

Halder, Subir et al. Don't hesitate to share! a novel IoT data protection scheme based on BGN cryptosystem. Designing Interactive Systems Conference. ACM 2 Penn Plaza, Suite 701, New York, NY 10121-0701 USA (2019): 284-291.

Hoffstein, Jeffrey et al. NTRUSIGN: Digital Signatures Using the NTRU Lattice. CT-RSA (2003).

Jao, David, et al. Supersingular isogeny key encapsulation. NIST Round 1 (2017).

Klooss, Michael et al. (R)CCA Secure Updatable Encryption with Integrity Protection. Advances In Databases and Information Systems; [Lecture Notes in Computer Science; Lect.Notes Computer]. Springer International Publishing, CHAM (2019): 68-99.

Lewi, Kevin et al. Securing Update Propagation with Homomorphic Hashing. IACR Cryptol. (2019): 227.

Lin, Qun et al. An ID-Based Linearly Homomorphic Signature Scheme and Its Application in Blockchain. IEEE Access 6 (2018): 20632-20640.

Linder, Richard and Chris Peikert. Better Key Sizes (and Attacks) for LWE-Based Encryption. IACR Cryptol (2010): 592.

Migliore, Vincent et al. Masking Dilithium: Efficient Implementation and Side-Channel Evaluation. IACR, vol. 20190418:190035 (2019): 1-28.

Nejatollahi, Hamid et al. Post-Quantum Lattice-Based Cryptography Implementations. ACM Computing Surveys (CSUR) 51 (2019): 1-41.

PCT/GB2021/050838 International Search Report and Written Opinion dated Jun. 7, 2021.

PCT/GB2021/051288 International Search Report and Written Opinion dated Jul. 21, 2021.

PCT/GB2021/053300 International Search Report and Written Opinion dated Feb. 25, 2022.

Penrose, R. On Best Approximate Solutions of Linear Matrix Equations. Mathematical Proceedings of the Cambridge Philosophical Society, vol. 52, No. 1, 1956, pp. 17-19., doi:10.1017/S0305004100030929.

Prest, Thomas et al. FALCON technical report, published by the National Institute of Standards and Technology (2019).

Rossi, Melissa. Extended Security of Lattice-Based Cryptography. (2020): 1-205.

U.S. Appl. No. 17/125,573 Corrected Notice of Allowability dated Jan. 5, 2023.

U.S. Appl. No. 17/125,573 Notice of Allowance dated Dec. 7, 2022.

U.S. Appl. No. 17/125,573 Office Action dated Jul. 20, 2022.

Yao, Jiang. The Direction of Updatable Encryption does not Matter Much. IACR. vol. 20200528:141110 (2020): 1-42. Retrieved from the Internet:URL: http://eprint.iacr.org/2020/622.pdf .

* cited by examiner

Algorithm 1 Keygen()
─────────────────────────────────────────────────────
Require: None
Ensure: An encryption key ek, a decryption key dk
1: $A \leftarrow D_A$ ▷ $A \in \mathcal{R}^{n \times n}$
2: $S \leftarrow D_S$ ▷ $S \in \mathcal{R}^{n \times m}$
3: $E \leftarrow D_E$ ▷ $E, B \in \mathcal{R}^{n \times m}$
4: $B \leftarrow AS + E$
5: return $ek := (A, B), dk := S$
─────────────────────────────────────────────────────

*FIG. 4A*

Algorithm 2 Enc(ek, msg)
─────────────────────────────────────────
Require: An encryption key $ek = (A, B)$, a message msg
Ensure: A ciphertext ctxt
1: $R \leftarrow D_R$ ▷ $R, E', U \in \mathcal{R}^{a \times n}$
2: $E' \leftarrow D_{E'}$
3: $E'' \leftarrow D_{E''}$ ▷ $E'', V \in \mathcal{R}^{a \times m}$
4: $U \leftarrow RA + E'$
5: $V \leftarrow RB + E'' + \text{Encode}(\text{msg})$
6: return $ctxt := (U, V)$
─────────────────────────────────────────

*FIG. 4B*

Algorithm 3 Dec(dk, ctxt)
──────────────────────────────────────
Require: A decryption key $dk = S$, a ciphertext $ctxt = (U, V)$
Ensure: A message msg
1: $M \leftarrow V - US$
2: return $msg := \text{Decode}(M)$
──────────────────────────────────────

*FIG. 4C*

Algorithm 4 MultiEnc$((ek_i)_{i \in [k]}, \text{msg})$
─────────────────────────────────────────────────────
Require: A system parameter A, encryption keys $(ek_i = B_i)_{i \in [k]}$, a message msg
Ensure: A multi-ciphertext mctxt
1: $R \leftarrow D_R$ ▷ $R, E', U \in \mathcal{R}^{a \times n}$
2: $E' \leftarrow D_{E'}$
3: $U \leftarrow RA + E'$
4: for $i \in [k]$ do
5: $\quad E_i'' \leftarrow D_{E''}$ ▷ $E_i'', V_i \in \mathcal{R}^{a \times m}$
6: $\quad V_i \leftarrow RB_i + E_i'' + \text{Encode}(\text{msg})$
7: return $mctxt := (U, V_0, \ldots, V_{k-1})$
─────────────────────────────────────────────────────

*FIG. 4D*

---
Algorithm 5 InsecureMultiEnc$((ek_j)_i, (msg_j)_j)$

Require: A system parameter A, encryption keys $(ek_i = B_i)_{i \in [k]}$, messages $(msg_j)_{j \in [k]}$
Ensure: A multi-ciphertext mctxt
1:  $R \leftarrow D_R$                                        ▷ $R, E', U \in \mathcal{R}^{m \times n}$
2:  $E' \leftarrow D_{E'}$
3:  $U \leftarrow RA + E'$
4:  for $i \in [k]$ do
5:      $E_i'' \leftarrow D_{E''}$                              ▷ $E_i'', V_i \in \mathcal{R}^{m \times m}$
6:      $V_i \leftarrow RB_i + E_i'' + \text{Encode}(msg_i)$
7:  return mctxt $:= (U, V_0, \ldots, V_{k-1})$
---

FIG. 5A

---
Algorithm 6 Keygen()

Require: None
Ensure: An encryption key ek, a decryption key dk
1:  $S \xleftarrow{R} \mathcal{K}_A$
2:  $P \leftarrow \text{isogen}(S)$
3:  return $ek := P$, $dk := S$
---

FIG. 5B

---
Algorithm 7 Enc(ek, msg)

Require: An encryption key
    $ek = P$, a message msg
Ensure: A ciphertext ctxt
1:  $s_B \xleftarrow{R} \mathcal{K}_B$
2:  $U \leftarrow \text{isogen}(s_B)$
3:  $j \leftarrow \text{isoex}(P, s_B)$
4:  $V \leftarrow msg \oplus H(j)$
5:  return ctxt $:= (U, V)$
---

FIG. 5C

---
Algorithm 8 Dec(dk, ctxt)

Require: A decryption key
    $dk = S$, a ciphertext ctxt $= (U, V)$
Ensure: A message msg
1:  $j \leftarrow \text{isoex}(U, S)$
2:  return msg $:= V \oplus H(j)$
---

FIG. 5D

```
Algorithm 9 MultiEnc((ek_i)_{i∈[k]}, msg)
Require: An encryption key ek_i = P_i, a message msg
Ensure: A multi-ciphertext mctxt
 1: s_B ←$ K_B
 2: U ← isogen(s_B)
 3: for i ∈ [k] do
 4:    j_i ← isoex(P_i, s_B)
 5:    V_i ← msg ⊕ H(j_i)
 6: return mctxt := (U, V_0, ..., V_{k-1})
```

*FIG. 6A*

```
Algorithm 10 MultiEnc((ek_i)_{i∈[k]}, msg)
Require: An encryption key ek_i = P_i, a message msg_i
Ensure: A multi-ciphertext mctxt
 1: s_B ←$ K_B
 2: U ← isogen(s_B)
 3: for i ∈ [k] do
 4:    j_i ← isoex(P_i, s_B)
 5:    V_i ← msg_i ⊕ H(j_i)
 6: return mctxt := (U, V_0, ..., V_{k-1})
```

*FIG. 6B*

| Scheme | \|U\| | \|V\| | \|ctxt\| | Asymptotic gain factor |
|---|---|---|---|---|
| Round5 R5ND_1KEMb | 429 | 110 | 539 | 4.9 |
| Round5 R5ND_3KEMb | 756 | 74 | 830 | 11.22 |
| Round5 R5ND_5KEMb | 940 | 142 | 1082 | 7.62 |
| LightSaber | 640 | 96 | 736 | 7.67 |
| Saber | 960 | 128 | 1088 | 8.5 |
| FireSaber | 1280 | 192 | 1472 | 7.67 |
| NewHope-512-CPA-KEM | 896 | 192 | 1088 | 5.67 |
| NewHope-1048-CPA-KEM | 1792 | 384 | 2176 | 5.67 |
| Kyber-512 | 640 | 96 | 736 | 7.67 |
| Kyber-768 | 960 | 128 | 1088 | 8.5 |
| Kyber-1024 | 1408 | 160 | 1568 | 9.8 |
| FrodoKEM-640 | 9600 | 120 | 9720 | 81 |
| FrodoKEM-976 | 15616 | 128 | 15744 | 123 |
| FrodoKEM-1344 | 21504 | 128 | 21632 | 169 |
| SIKE/p434 | 330 | 16 | 346 | 21.63 |
| SIKE/p503 | 378 | 24 | 402 | 16.75 |
| SIKE/p751 | 564 | 32 | 596 | 18.63 |
| SIKE/p434_compressed | 196 | 16 | 209 | 12.25 |
| SIKE/p751_compressed | 331 | 32 | 363 | 10.34 |

Algorithm 11 Keygen()

Require: None
Ensure: An encryption key ek, a decryption key dk
1: $(e_1, \ldots, e_n)$ sampled randomly from $\mathcal{M}$
2: $[\mathfrak{a}] = (\ell_1^{e_1}, \ldots, \ell_n^{e_n})$
3: $E_A \leftarrow [\mathfrak{a}] \cdot E_0$
4: return ek := A, dk := $(e_1, \ldots, e_n)$

*FIG. 12A*

Algorithm 12 Enc(ek, msg)

Require: An encryption key
   ek = A, a message msg
Ensure: A ciphertext ctxt
1: $(U, (e_1, \ldots, e_n)) \leftarrow$ Keygen()
2: Compute $[\mathfrak{b}]$ and $E_A$
3: $E_R \leftarrow [\mathfrak{b}] E_A$
4: $V \leftarrow$ msg $\oplus$ H($R$)
5: return ctxt := $(U, V)$

*FIG. 12B*

Algorithm 13 Dec(dk, ctxt)

Require: A decryption key
   dk = $(e_1, \ldots, e_n)$, a ciphertext ctxt = $(U, V)$
Ensure: A message msg
1: Compute $[\mathfrak{a}]$ from dk and $E_U$ from U
2: $E_R \leftarrow [\mathfrak{a}] E_U$
3: return msg := $V \oplus$ H($s$)

*FIG. 12C*

Algorithm 14 MultiEnc($(ek_j)_{j \in [k]}$, msg)

Require: List of $k$ encryption keys $ek_j = A_j$ for $j \in [1, k]$, a message msg
Ensure: A multi-ciphertext mctxt
1: $((e_1, \ldots, e_n), U) \leftarrow$ Keygen()
2: Construct $[\mathfrak{b}]$
3: for $j \in [k]$ do
4:    Construct $E_{A_j}$ from $A_j$
5:    $E_{R_j} \leftarrow [\mathfrak{b}] E_{A_j}$
6:    $V_j \leftarrow$ msg $\oplus$ H($R_j$)
7: return mctxt := $(U, V_1, \ldots, V_k)$

*FIG. 12D*

METHODS AND SYSTEMS FOR COMPRESSED ENCRYPTION

CROSS-REFERENCE

This application is a continuation application of International Application No. PCT/GB2021/050838, filed Apr. 6, 2021, which claims the benefit of UK Patent Application No. GB 20 05237.9, filed Apr. 8, 2020, all of which are incorporated herein by reference in their entirety.

BACKGROUND

The impending advent of practicable large-scale quantum computing brings with it a number of security challenges, not the least of which is that some currently used encryption methods are not resilient to quantum computer-based attacks. As such, new encryption methods are being developed, but they tend to lack the maturity and depth of study of more established methods, including the size and communication requirements of the methods.

SUMMARY

In an aspect, the present disclosure provides methods for decreasing the size of encryption updates and other encrypted messages produced using both pre- and post-quantum encryption schemes. By reusing at least some of the parameters used in the encryption process, one copy of those parameters can be sent out with the encryption for a decrease in the amount of data that is sent. Since one copy can be used instead of one copy per message, significant efficiency gains can be realized. This reuse can also enable more favorable organizational hierarchies to be used, which can improve performance when sending large numbers of encrypted methods when compared to non-reuse schemes. Combining the ruse of the parameters with sanitizable or redactable signature schemes can result in large server-side decreases in data that is transmitted during transmission of an encrypted message resulting in efficiency gains.

In another aspect, the present disclosure provides a method for transmitting a ciphertext comprising a plurality of encrypted parts to a plurality of users, comprising: (a) providing a common set of system parameters for the plurality of users; (b) generating the plurality of encrypted parts by encrypting a plaintext using parameters unique to each user of the plurality of users; (c) generating the ciphertext comprising a part derived from the common set of system parameters and the plurality of encrypted parts; and (d) transmitting the ciphertext to the plurality of users, wherein the ciphertext is decryptable at least in part using the parameters unique to each user of the plurality of users.

In some embodiments, the encrypted parts are encrypted using a lattice-based encryption scheme. In some embodiments, the encrypted parts are encrypted using an isogeny-based encryption scheme. In some embodiments, the common set of system parameters is generated using a seed and a pseudo-random number generator. In some embodiments, at least a parameter of the parameters unique to each user of the plurality of users is generated using a seed and a pseudo-random number generator. In some embodiments, the common set of system parameters or the parameters unique to each user of the plurality of users comprise non-square matrices.

In another aspect, the present disclosure provides a method for transmitting a ciphertext to a plurality of users, comprising: (a) generating a system parameter set, wherein the parameter set comprises parameters that do not depend on a public key of a user of the plurality of users; (b) generating a fixed component based at least in part on the system parameter set; (c) generating a plurality of variable components by encrypting a plaintext using each public key of the plurality of users; and (d) transmitting the ciphertext comprising the fixed component and the variable component to the plurality of users, wherein the ciphertext is decryptable at least in part using the fixed component.

In some embodiments, the encryption is based on an encryption scheme selected from the group consisting of a Lindner-Peikert scheme, a supersingular isogeny Diffie-Hellman protocol, and an isogeny-based public-key encryption scheme.

In another aspect, the present disclosure provides a method for organizing a database, comprising: (a) structuring a plurality of recipients in a tree structure of arity m, wherein 'm' is at least two; and (b) transmitting a compressed ciphertext update to less than all of the plurality of recipients.

In some embodiments, the arity m is at least about 8. In some embodiments, the arity m is from about 8 to about 16. In some embodiments, a number of bytes used for the transmitting is about a factor of at least two lower than a number of bytes for transmitting an update to each of the plurality of recipients. In some embodiments, the compressed ciphertext update is encrypted using a lattice-based encryption scheme. In some embodiments, the compressed ciphertext update is encrypted using an isogeny-based encryption scheme. In some embodiments, the transmitting comprises transmitting a same message to each node of the tree structure. In some embodiments, the same message comprises update information of an encryption key of a user of the database. In another aspect, the present disclosure provides a method for performing an encryption update comprising a plurality of encryption keys and a multi-ciphertext to a plurality of recipient nodes, comprising: (a) receiving the encryption update; (b) generating a reduced encryption update by removing one or more of the plurality of encryption keys and one or more ciphertexts of the multi-ciphertext; (c) transmitting the reduced encryption update to a recipient node of the plurality of recipient nodes; and (d) repeating (b)-(c) for one or more other nodes of the plurality of nodes. In some embodiments, each node receives a reduced encryption update comprising one encryption key of the plurality of encryption keys and one ciphertext of the multi-ciphertext. In some embodiments, each node of the plurality of nodes receives a reduced encryption update comprising a different encryption key of the plurality of encryption keys and a different ciphertext of the multi-ciphertext from each other node of the plurality of nodes. In some embodiments, the recipient nodes have child nodes. In some embodiments, the child nodes can access a decryption key of each recipient node in a path of the child nodes. In some embodiments, (d) is performed at a substantially same time for each node of the plurality of nodes. In some embodiments, the method further comprises reducing a number of bytes sent to the plurality of nodes by a factor of at least about n, where n is the number of nodes in the plurality of nodes. In some embodiments, the one or more ciphertexts are encrypted using a lattice-based encryption scheme. In some embodiments, the one or more ciphertexts are encrypted using an isogeny-based encryption scheme. In some embodiments, the encryption update is signed with a sanitizable signature. In some embodiments, the sanitizable signature facilitates the removing the one or more of the plurality of encryption keys and the plurality of multi-ciphertexts.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIGS. 4A-4C show an example of a Lindner-Peikert framework.

FIG. 4D shows an example of pseudocode for an implementation of ciphertext compression for a single message sent to one or more recipients.

FIG. 5A shows an example of pseudocode for an implementation of ciphertext compression for one or more messages sent to one or more recipients.

FIGS. 5B-5D show examples of pseudocode for an implementation of a SIKE public key encryption scheme.

FIG. 6A shows an example of pseudocode for an implementation of ciphertext compression in a SIKE public key encryption scheme for one message sent to one or more recipients.

FIG. 6B shows an example of pseudocode for an implementation of ciphertext compression in a SIKE public key encryption scheme for one or more messages sent to one or more recipients.

FIGS. 12A-12D show examples of pseudocode for an implementation of a commutative supersingular isogeny Diffie-Hellman (cSIDH) public key encryption scheme.

FIG. 12D shows an example of pseudocode for an implementation of ciphertext compression for a single message sent to one or more recipients.

DETAILED DESCRIPTION

Figure 1:
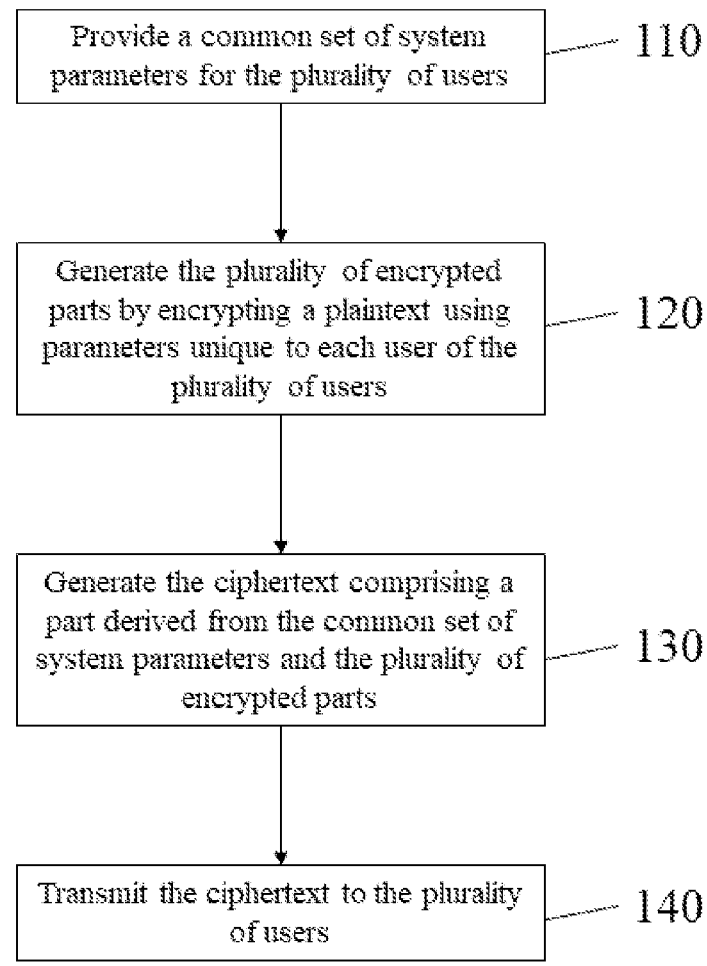
FIG. 1 is a flow chart of an example process for transmitting a plurality of ciphertexts to a plurality of users.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "ciphertext," as used herein, generally refers to an encrypted text. The encryption may be encryption performed by an algorithm. The text may be numbers (e.g., binary representations), letters, words, or the like, or any combination thereof. A ciphertext may be an encrypted plaintext. A ciphertext may be an encrypted message. A multi-ciphertext may be one or more ciphertexts in a same package.

The term "public key," as used herein, generally refers to an encryption key that is used for encryption. The public key may not be kept secret. The public key may be accessed a user (e.g., a user sending a message), a service (e.g., a software running on an appropriately configured computer), or any other sender/receiver of an encrypted object. The public key may be used to encrypt a plaintext into a ciphertext. For example, a user Alice can use the public key of a user Bob to encrypt a plaintext that can then only be decrypted by Bob.

The term "private key," as used herein, generally refers to an encryption key used for decryption. The private key may be kept secret a user (e.g., a user sending a message), a service (e.g., a software running on an appropriately configured computer), or any other sender/receiver of an encrypted object. The private key may be used to decrypt a ciphertext into a plaintext.

The term "encryption scheme," as used herein, generally refers a method of encrypting and decrypting. The encryption scheme may be a lattice-based scheme. Examples of encryption schemes may be public-key encryption, symmetric key encryption (e.g., advanced encryption standard (AES)), Round5, Saber, NewHope, Kyber, FrodoKEM, and Supersingular Isogeny Key Encapsulation. The encryption scheme may be a key encapsulation mechanism (KEM). The encryption scheme may be a code-based encryption scheme. Examples of code-based encryption schemes may be BIKE-3, ROLLO-3, HQC, RQC, or the like. Other examples of lattice-based, code-based, or other encryption schemes can be found in the National Institutes for Standards and Testing (NIST) Post-Quantum Cryptography project files, such as the "Status Report on the First Round of the NIST Post-Quantum Cryptography Standardization Process" by Alagic et al. published Jan. 31, 2019 (DOI: 10.6028/NISTIR.8240), which is incorporated by reference in its entirety. The encryption scheme may be a public key encryption scheme (PKE).

A multi-ciphertext may be used in implementing a ciphertext compression scheme. For example, using a multi-ciphertext to reduce the amount of data sent during a key update can be a ciphertext compression. The terms may be related as such throughout the present disclosure. The multi-ciphertext may comprise a plurality of ciphertexts.

The present disclosure provides methods and systems for transmitting a ciphertext comprising a plurality of encrypted parts to a plurality of users. A method for transmitting a ciphertext comprising a plurality of encrypted parts to a plurality of users may comprise providing a common set of system parameters for the plurality of users. A plurality of encrypted parts may be generated by encrypting a plaintext using parameters unique to each user of the plurality of users. The ciphertext comprising a part derived from the common set of system parameters and the plurality of encrypted parts may be transmitted to the plurality of users. The plurality of ciphertexts may be decryptable at least in part using the parameters unique to each user of said plurality of users.

FIG. 1 is a flow chart of an example process 100 for transmitting a plurality of ciphertexts to a plurality of users. In an operation 110, the process 100 may comprise providing a common set of system parameters for the plurality of users. The plurality of ciphertexts may be at least about 2, 3, 4, 5, 6, 7, 8, 9, 10, 50, 100, 250, 500, 1,000, 5,000, 10,000, 50,000, 100,000, 500,000, 1,000,000, or more ciphertexts. The plurality of ciphertexts may be at most about 1,000,000, 500,000, 100,000, 50,000, 10,000, 5,000, 1,000, 500, 250, 100, 50, 10, 9, 8, 7, 6, 5, 4, 3, 2, or fewer ciphertexts. The number of users in the plurality of users may be greater than, equal to, or less than the number of ciphertexts in the plurality of ciphertexts. For example, 500 ciphertexts can be generated for delivery to 1,000 users. The plurality of users may be, for example, server clients (e.g., client devices receiving updates from a server, intermediary servers receiving updates to pass along to other clients, etc.), messaging recipients, website visitors, systems receiving software updates, or the like. The messaging recipients may be recipients of a digital message (e.g., an email, a short message service (SMS), a multimedia messaging service (MMS)). The systems receiving software updates may be server devices (e.g., computing clusters), end user devices (e.g., laptop computers, desktop computers, smartphones, tablets), or the like. For example, a central server can output an update to be received by a plurality of server nodes. In another example, a desktop computer can output a peer-to-peer update to another desktop computer. The ciphertexts may be encrypted using a lattice-based encryption scheme, an isogeny-based encryption scheme (e.g., a supersingular isogeny-based encryption scheme), a prime factorization-based encryption scheme, another encryption scheme described elsewhere herein, or the like. The encryption scheme may be a post-quantum encryption scheme (e.g., a scheme more resistant to attacks by non-classical computers). The encryption scheme may be a pre-quantum encryption scheme (e.g., a presently utilized encryption scheme). The encryption scheme may operate on a chosen ciphertext attack (CCA) security level. The encryption scheme may operate on a chosen plaintext attack (CPA) security level.

The common set of system parameters may not depend on the public key of a user of the plurality of users. For example, the common set of system parameters can be common to each user of the plurality of users. The common set of system parameters may be related to the type of encryption scheme used to generate the ciphertext. For example, for an isogeny-based encryption method, the common set of system parameters can be a large integer. In another example, the common set of system parameters can be one or more matrices comprising numbers or polynomials. The common set of system parameters may provide a detailed description of an instance of the encryption scheme. For example, a common set of system parameters for a lattice-based encryption scheme can be different than a common set of parameters for a prime factorization-based encryption scheme. In another example, the system parameters can be an example of the encryption scheme for use as a template. At least one parameter of the common set of system parameters may be generated using a seed and a pseudo-random number generator. For example, a message to be encrypted as a ciphertext can be converted into a numerical seed and fed into a pseudo-random number generator to generate a system parameter. The common set of system parameters may be compressed. The compression may be a lossy compression or a lossless compression. For example, low-order bits may be dropped to reduce the size of one or more parameters. The common set of system parameters may be represented as A elsewhere herein.

In another operation 120, the process 100 may comprise generating the plurality of encrypted parts by encrypting a plaintext using parameters unique to each user of the plurality of users. The parameters unique to each user of the plurality of users may comprise one or more public keys. For example, a user Alice can encrypt a message for a user Bob using Bob's public key, and a ciphertext sent from Alice to Bob can comprise the encrypted message. A public key may comprise one or more encryption keys, one or more verification keys, one or more identification numbers, or the like, or any combination thereof. The ciphertext may comprise a fixed part and a variable part. The fixed part may depend on the common set of system parameters. The fixed part may be the same for each user of the plurality of users. The fixed part may be referred to as U elsewhere herein. The variable part may depend from both the common set of system parameters and on the parameters unique to each user of the plurality of users (e.g., the public keys of each user of the plurality of users). The variable part may be referred to as V elsewhere herein. At least a parameter of the parameters unique to each user of the plurality of users may be generated using a seed and a pseudo-random number generator. For example, a seed comprising the public key of a user can be input into a pseudo-random number generator to generate a parameter unique to the user. In another example, a seed can be input into a pseudo-random number generator to generate a public key of a user. The common set of system parameters may comprise one or more non-square matrices. The parameters unique to each user of the plurality of users may comprise one or more non-square matrices. The non-square matrices may contain numbers, polynomials, other equations, or the like. The encrypting may be encrypting by an encryption scheme described elsewhere herein. The parameters unique to each user of the plurality of users may be referred to as public keys elsewhere herein.

In another operation 130, the process 100 may comprise generating the ciphertext comprising a part derived from the common set of system parameters and the plurality of encrypted parts. In another operation 140, the process 100 may comprise transmitting the ciphertext to the plurality of users. The plurality of ciphertexts may be decryptable at least in part using the parameters unique to each user of the plurality of users. A plurality of ciphertexts may be joined into a single multi-ciphertext. For example, a single transmission can comprise a plurality of ciphertexts. The transmitting may be over a communications protocol (e.g., the Internet Protocol (IP), the Transmission Control Protocol (TCP), the Hypertext Transfer Protocol (HTTP) or its secure variant (HTTPS), or the like). The transmitting may be in a scheme as demonstrated in any one of FIGS. 10A-10E. The transmitting may comprise transmitting the common set of system parameters and the plurality of ciphertexts to a distributer, where the distributer may transmit the common set of system parameters and one ciphertext of the plurality of ciphertexts to each user of the plurality of users.

The common set of system parameters may be generated at least in part by a probability distribution. The use of a probability distribution to generate parameters may impart additional security to methods and systems described herein. The probability distribution may be such that a parameter generated using the probability distribution lies on a finite ring R (where R can satisfy $R=Z_q$ or $R=Z_q/m$, where $Z_q$ are integers modulo q and m is a monic polynomial) such that the parameter $\in R$.

The present disclosure provides methods and systems for sending a ciphertext to a plurality of users. A method for sending a ciphertext to a plurality of users may comprise generating a system parameter set. The system parameter set may comprise parameters that do not depend on a public key of a user of the plurality of users. A fixed component may be generated based at least in part of the system parameter set. A plurality of variable components may be generated by encrypting a plaintext using each public key of the plurality of users. The encryption may be based on an encryption scheme selected from the group consisting of a Lindner-Peikert scheme, a supersingular isogeny Diffie-Hellman protocol, and an isogeny-based public-key encryption scheme. The ciphertext comprising the fixed component and the variable component may be transmitted to the plurality of users. The ciphertext may be decryptable at least in part using the fixed component. The ciphertext may be a multi-ciphertext.

The present disclosure provides methods and systems for organizing a database. A method for organizing a database may comprise structuring a plurality of recipients in a tree structure of arity 'm'. Arity 'm' may be at least two. A compressed ciphertext update may be transmitted to less than all of the plurality of recipients.

Figure 2:
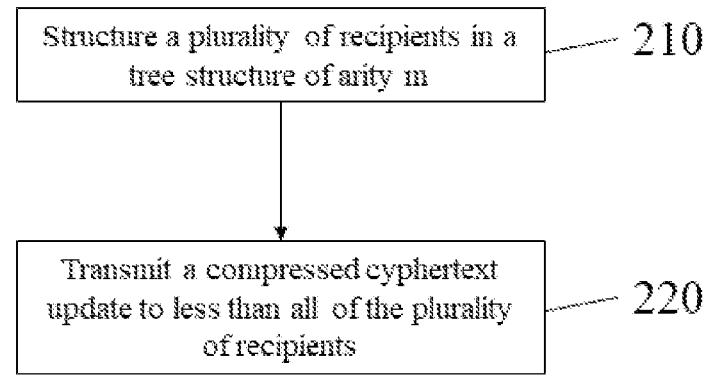
FIG. 2 is a flow chart of an example process for sending a plurality of ciphertexts to a plurality of users.

FIG. 2 is a flow chart of an example process 200 for sending a plurality of ciphertexts to a plurality of users. In an operation 210, the process 200 may comprise structuring a plurality of recipients in a tree structure of arity m. The arity may be the maximum number of child nodes a node of a tree can have. For example, a tree of arity 4 has at most 4 child nodes per nodes. Examples may be found in FIG. 10D, which shows a tree of arity 2, and FIG. 10E, which shows a tree of arity 4. The arity 'm' may be at least about 1, 2, 3, 4, 5, 6, 7, 8, 9, 10, 11, 12, 13, 14, 15, 16, 17, 18, 19, 20, 21, 22, 23, 24, 25, 50, 100, 250, 500, 1,000 or more. The arity 'm' may be at most about 1,000, 500, 250, 100, 50, 25, 24, 23, 22, 21, 20, 19, 18, 17, 16, 15, 14, 13, 12, 11, 10, 9, 8, 7, 6, 5, 4, 3, 2, 1, or less. The arity 'm' may be in a range as defined by any two points above. For example, the tree may of an arity of 8-16. The plurality of recipients may be other nodes of the tree. The other nodes of the tree may have their own child nodes. For example, the plurality of recipients of an update from node 1 of FIG. 10E may be the nodes including nodes 2, 3, and 4 as well as nodes 18, 19, and 20. A node of the tree structure may be configured to house information used for encryption of the node or any child nodes of the node.

In another operation 220, the process 200 may comprise transmitting a compressed ciphertext update to less than all of the plurality of recipients. The transmitting may be transmitting over a network. The network may be a public network (e.g., the internet) or a private network (e.g., a local network). The compressed ciphertext update may be generated by the methods and systems described elsewhere herein. The compressed ciphertext update may be encrypted using a lattice-based encryption scheme, an isogeny-based encryption scheme, or the like. A number of bytes for transmitting the compressed ciphertext update may be a factor of at least about 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, or more lower than a number of bytes for transmitting an update to each of the plurality of recipients. A number of bytes for transmitting the compressed ciphertext update may be a factor of at most about 25, 24, 23, 22, 21, 20, 19, 18, 17, 16, 15, 14, 13, 12, 11, 10, 9.5, 9, 8.5, 8, 7.5, 7, 6.5, 6, 5.5, 5, 4.5, 4, 3.5, 3, 2.5, 2, 1.9, 1.8, 1.7, 1.6, 1.5, 1.4, 1.3, 1.2, 1.1, or less lower than a number of bytes for transmitting an update to each of the plurality of recipients.

The transmitting may comprise transmitting a same message to each node of the tree structure. The message may comprise update information of a key of a user of the database. For example, a user can send a key update to each node of the tree structure. In another example, the user can send a key update using a compressed ciphertext to each node at a certain level of the tree. The message may be a message as described elsewhere herein (e.g., a text message, a software update, an encryption key update). The transmitting may comprise transmitting a different message to each node of the tree structure. For example, a different encrypted message can be sent from a user to each of a plurality of other users. The transmitting may comprise transmitting a number of different messages to each node of the tree structure less than the number of nodes of the tree structure. For example, each node at a particular depth can receive the same message. In this example, a tree of arity 4 and depth 2 can have one message sent to the three nodes that are children of the same parent node and another message that is sent to the nodes that share a parent with the parent node, resulting in a total of 6 updates being sent. In this example, sending 6 updates instead of the 15 that may have been sent out without using a ciphertext compression scheme results in a number of bytes for transmitting the compressed ciphertext update being a factor of 15/6=2.5 lower than a number of bytes for transmitting an update to each of the recipients. In another example, a tree of arity 4 and depth 2 where the child nodes have access to the decryption keys in the path of the node can be updated by sending a multi-ciphertext to 2 nodes, such as nodes 17 and 21 of FIG. 10E. In this example, the communications cost can be improved by a factor of 15/2=7.5 as compared to sending updates to each node of the plurality of nodes. The transmitting may comprise transmitting d ciphertexts in a multi-ciphertext, where $d=\log_m N$, where m is the arity of the tree and N is the number of recipient (e.g., user) nodes.

The present disclosure provides methods and systems for performing an encryption update comprising a plurality of encryption keys and a plurality of multi-ciphertexts to a plurality of recipient nodes. A method for performing an encryption update comprising a plurality of encryption keys and a plurality of multi-ciphertexts to a plurality of recipient nodes may comprise receiving the encryption update. A reduced encryption update may be generated by removing one or more of the plurality of encryption keys and one or more ciphertexts of the plurality of multi-ciphertexts. The reduced encryption update may be transmitted to a recipient node of the plurality of recipient nodes. The operations may be repeated for one or more other nodes of the plurality of nodes.

Figure 3:
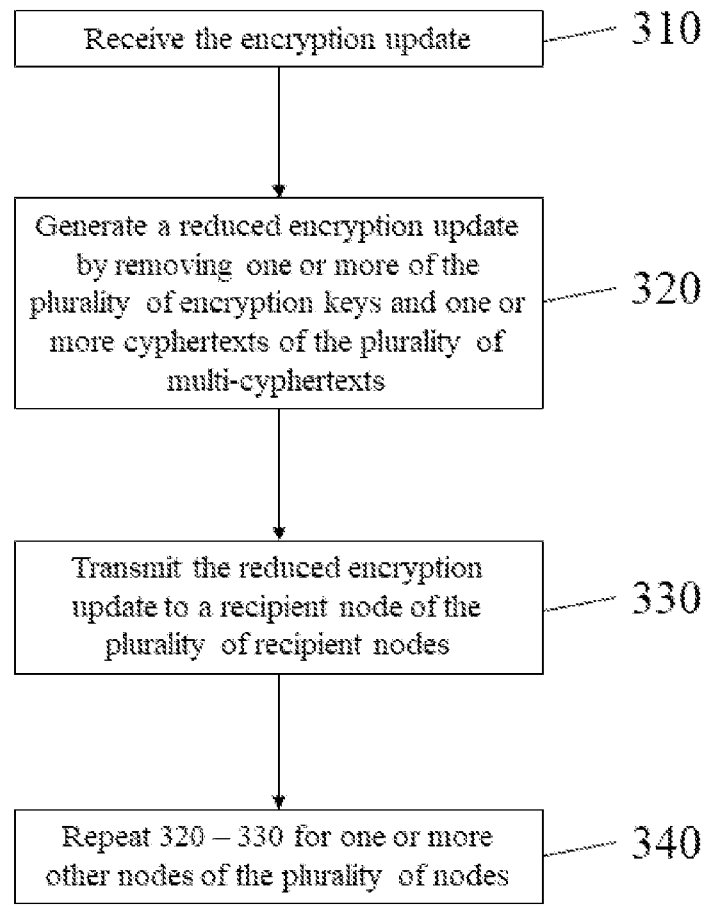
FIG. 3 is a flow chart of an example process for performing an encryption update comprising a plurality of encryption keys and a plurality of multi-ciphertexts to a plurality of recipient nodes.

FIG. 3 is a flow chart of an example process 300 for performing an encryption update comprising a plurality of encryption keys and a plurality of multi-ciphertexts to a plurality of recipient nodes. In an operation 310, the process 300 may comprise receiving the encryption update. The encryption update may comprise a plurality of encryption keys and/or a plurality of multi-ciphertexts. The encryption update may comprise information such as half of an encryption key pair, an encrypted message, or any data representable as binary or hexadecimal strings. The encryption update may be received from one or more sending devices. The one or more sending devices may be computing devices (e.g., servers, mobile devices, computing devices, etc.). For example, a user's smartphone can send an encryption update. The encryption update may be received by an appropriately programmed computer (e.g., a server computer). For example, a user's laptop can send an encryption key update to a secure messaging server. The sending device may be of a same type as the plurality of recipient nodes. For example, a sending device can be a smartphone, and the recipient nodes can be smartphones as well. The sending device may be a same type as at least some nodes of the plurality of recipient nodes. For example, a sending device can be a smartphone, and the recipient nodes can be other smartphones as well as server nodes.

The encryption update may be signed with a sanitizable signature. The sanitizable signature may be configured to permit operations on one or more blocks of data in the encryption update without compromising the signature or effecting one or more other blocks of data. The operations may be rewrites, amendments, deletions, additions, or the like, or any combination thereof. For example, a multi-ciphertext comprising a plurality of ciphertexts signed with a sanitizable signature can have a ciphertext of the plurality of ciphertexts deleted while maintaining the signature. The user or system generating the encryption update may designate the portions of the encryption update that are modifiable without impacting the signature, the operations that are possible without impacting the signature, or the like, or any combination thereof. For example, a system can designate which blocks of data can be deleted without impacting the signature. The ciphertexts may be encrypted using a lattice-based encryption scheme. The one or more ciphertexts may be encrypted ciphertexts as described elsewhere herein (e.g., generated using a lattice-based encryption scheme, generated using an isogeny-based encryption scheme). The sanitizable signature may be unforgeable, immutable, or a combination thereof. The sanitizable signature may also be private, transparent, accountable, or any combination thereof. The sanitizable signature may instead be a redactable signature. The sanitizable signature may be based on a Merkle tree.

In another operation 320, the process 300 may comprise generating a reduced encryption update by removing one or more of the plurality of encryption keys and one or more ciphertexts of the plurality of multi-ciphertexts. The removing may be performed in the absence of impacting the signature. The sanitizable signature may facilitate the removing one or more of the plurality of encryption keys and the plurality of multi-ciphertexts. For example, an encryption update with a sanitizable signature can be modified without impacting the signature, while an encryption update without a sanitizable signature cannot. The removing may be performed by a recipient of the encryption update. For example, a host server can remove blocks from an update received from a user. The removing may comprise removing one or more of the encryption keys and/or one or more ciphertexts of the multi-ciphertext. One or more ciphertexts may be removed from an update to a recipient node that does not need the one or more ciphertexts. For example, in a multi-ciphertext comprising updates for nodes A, B, and C, a server can remove the updates for B and C from the reduced encryption update sent to A. The removal of the one or more ciphertexts may reduce an update size sent to the recipient nodes. The number of bytes sent to the plurality of nodes may be reduced by a factor of at least about n, where n is the number of nodes in the plurality of nodes, as compared to the number of bytes that may be used to send an update to each node of the plurality of recipient nodes. The number of bytes sent to the plurality of nodes may be reduced by a factor of at most about n, where n is the number of nodes in the plurality of nodes, as compared to the number of bytes that may be used to send an update to each node of the plurality of recipient nodes. The number of bytes sent to the plurality of nodes may be reduced by a factor of at least about 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, or more as compared to the number of bytes that may be used to send an update to each node of the plurality of recipient nodes.

The number of bytes sent to the plurality of nodes may be reduced by a factor of at most about 25, 24, 23, 22, 21, 20, 19, 18, 17, 16, 15, 14, 13, 12, 11, 10, 9.5, 9, 8.5, 8, 7.5, 7, 6.5, 6, 5.5, 5, 4.5, 4, 3.5, 3, 2.5, 2, 1.9, 1.8, 1.7, 1.6, 1.5, 1.4, 1.3, 1.2, 1.1, or less as compared to the number of bytes that may be used to send an update to each node of the plurality of recipient nodes.

In another operation 330, the process 300 may comprise transmitting the reduced encryption update to a recipient node of the plurality of recipient nodes. The recipient node may decrypt the encryption update. The recipient node may receive one encryption key and one ciphertext. The one or more ciphertexts of the multi-ciphertext may not be transmitted to all of the plurality of nodes. For example, for a system with three nodes, an update with three ciphertexts in the multi-ciphertext can be broken down into three single ciphertext updates. In this example, each node can receive one particular ciphertext of the three, and thus all ciphertexts of the multi-ciphertext are not transmitted to all nodes of the plurality of nodes. The reduced ciphertext may be transmitted over a public network (e.g., the internet), a private network (e.g., a virtual private network (VPN), a local network), or the like. The reduced ciphertext may still comprise a valid signature.

In another operation 340, the process 300 may comprise repeating operations 320-330 for one or more other nodes of the plurality of nodes. Operation 340 may be performed at substantially the same time for each node of the plurality of nodes. Operation 340 may provide an encryption key update to an entire server. Each node may receive a reduced encryption update comprising one encryption key of the plurality of encryption keys and one ciphertext of the multi-ciphertext. For example, a server can reduce the plurality of encryption keys and multi-ciphertext down to a single encryption key and single ciphertext to send to a node. Each node of the plurality of nodes may receive a reduced encryption update comprising a different encryption key of the plurality of encryption keys and a different ciphertext of the multi-ciphertext from each other node of the plurality of nodes. For example, for an encryption update (U, $V_1$, $V_2$), node one can receive (U, $V_1$) and node two can receive (U, $V_2$). The recipient nodes may have one or more child nodes. The child nodes may be of a tree structure. The child nodes may in turn have one or more additional child nodes. For example, nodes 5, 6, 7, and 8 of FIG. 10E can be child nodes of node 18. The child nodes may have access to one or more parameters stored in the recipient nodes. The child nodes may be able to access a decryption key of each recipient node in a path of the child nodes.

FIGS. 4A-4C show an example of a Lindner-Peikert (LP) framework. Additional details of a Lindner-Peikert frameworks can be found in "Better key sizes (and attacks) for LWE-based encryption" by Richard Lindner and Chris Peikert; In Aggelos Kiayias, editor, CT-RSA 2011, volume 6558 of LNCS, pages 319-339. Springer, Heidelberg, February 2011, which is incorporated by reference in its entirety. The LP framework may be used as a framework to interpret several encryption schemes. The LP framework may provide a convenient framework for describing ciphertext compression methods herein. FIG. 4A shows an example function keygen( ) that can be used to produce an encryption key ek and a decryption key dk. The $D_*$ functions may be probability distribution functions as described elsewhere herein. In introducing randomness using the probability distributions, the LP framework may be made to be more resistant to quantum computer-based attacks. A plurality of parameters A, S, and E can be generated using the probability distributions, and can be combined to form a parameter B. While shown here as a square matrix, parameter A may be non-square. The scheme may remain functional by adapting the dimensions of the other matrices (e.g., S, E). In FIG. 4B, the parameters generated in the equations of FIG. 4A may be used to encrypt a message msg. The encrypted message may be represented by V, while one or more system parameters not related to a public key may be represented by U. A ciphertext may comprise both U and V. For example, a number of system parameters along with an encoded message can be concatenated into a single ciphertext. FIG. 4C shows a decryption process for the ciphertext generated in FIG. 4B.

A number of modifications may be made to the LP framework to refine it. One modification may be to enable more compact representations of the elements of FIGS. 4A-4C (e.g., A, S, E, B, R, E', E'', U, and V) by representing one or more of the elements as seeds which can be passed through a generator to recompile the one or more elements. The generator may be a pseudo-random number generator. For example, A can be represented as a seed that, upon being input into the random number generator, generates the full matrix A. The seed may be another element. For example, the public key ek can be used as a seed for element A. In another example, the plaintext message msg can be used as a seed for element S. A compression may be applied to one or more of the elements. The compression may be lossy or lossless. For example, a lossy compression can be applied to elements B, U, and V by dropping low-order bits. The application of compression may reduce the size of the elements, and thus the size of any updates involving the elements.

FIG. 4D shows an example of pseudocode for an implementation of ciphertext compression for a single message sent to one or more recipients. By taking a common A element for each user k, the number of A elements used may be decreased by k. This reuse of A elements may be compatible with generating A from a seed. By reusing A, the same R and E' may be used for each of the k users. By applying these two changes to the encoding process of FIG. 4B, a new process for generating multi-ciphertexts may be followed. The multi-ciphertext may encrypt simultaneously the same message msg to k distinct users. The multi-ciphertext (U, $V_i$) may be decrypted by each user i of the k users using the same decryption algorithm of FIG. 4C. By reusing system parameters U for each of the k users, a total communications cost for the multi-ciphertext may be |U|+|V|, where |x| may be the bytesize of x. In contrast, the total communications cost for sending k ciphertexts may be k·(|U|+|V|). In instances where there are many users k, the use of a multi-ciphertext may reduce the total communications cost by a factor of about $$\frac{|U|+|V|}{|V|}.$$

The reduction in total communications cost may be higher for cases where |U|>>|V|. The improvement of performance for various encryption schemes may be found in FIG. 8.

In an example, the process of FIG. 4D may begin with providing one or more system parameters A, one or more encryption keys $ek_i=B_i$ for each user i of the k users, and a common message msg. The example process of FIG. 4D may begin with the generation of parameters R and E' from a distribution function. The parameters R, E', and A (e.g., the system parameter that is reusable for each user) may be combined such that U←RA+E'. The parameter U may comprise information that is usable by each user of the plurality of users (e.g., information that does not rely on a public key of the user). For each user i of the k users, a parameter E" may be generated from another distribution function and used such that $V_i \leftarrow RB_i + E_i" + \text{Encode (msg)}$. This may generate $V_i$'s, which can then be concatenated with the parameter U such that mctxt:=(U, $V_0, \ldots, V_{k-1}$), where mctxt may be a multi-ciphertext. The multi-ciphertext may have a size equal to the size of U plus k times the size of V.

FIG. 5A shows an example of pseudocode for an implementation of ciphertext compression for one or more messages sent to one or more recipients. The example of FIG. 5A may be a multi-message analogue of the example of FIG. 4D. In FIG. 5A, the single message msg of FIG. 4D may be replaced with a different message $msg_i$ for each user i of the k users. The process may be otherwise similar, and follow similar trends as described elsewhere herein. A difference may be that |V| may not be constant, as each message $msg_i$ may have a different size.

Figure 9:
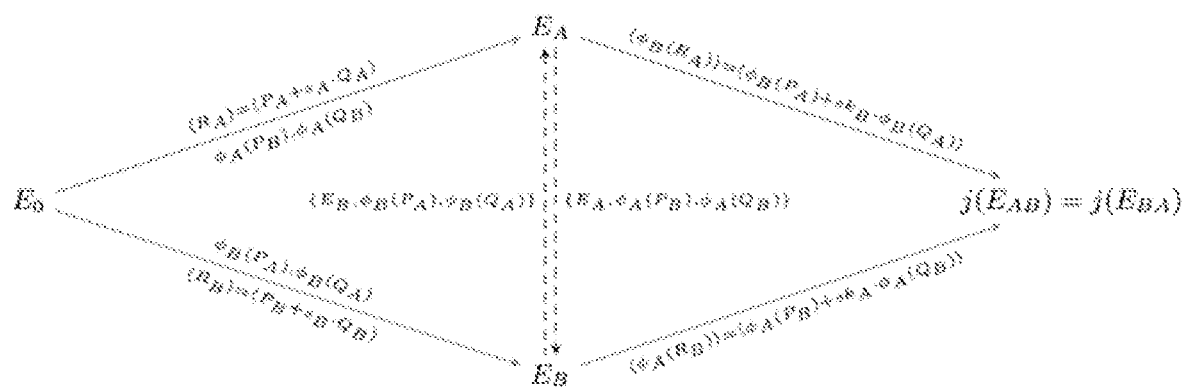
FIG. 9 shows an example of a Supersingular isogeny Diffie-Hellman key exchange (SIDH).

FIGS. 5B-5D show examples of pseudocode for an implementation of a Supersingular Isogeny Key Encapsulation (SIKE) public key encryption scheme. FIGS. 5B-5D may differ from FIGS. 4A-4C in that FIGS. 5B-5D may be based on the SIKE scheme described by David Jao et al. in the Supersingular Isogeny Key Encapsulation specification, published by the National Institute of Standards and Technology on Mar. 31, 2019 as part of the SIKE submission package (which is incorporated herein by reference). In FIG. 5B, to generate private (or decryption key) S, a random member of keyspace $K_A$ may be selected. The isogeny of S may then be computed using isogeny algorithm isogen to generate P, the public (or encryption) key. Similarly, in FIG. 5C, $s_B$ can be generated from keyspace $K_B$. From there parameter U (e.g., a parameter that does not depend on a public key of a user) can be generated from the isogeny algorithm isogen calculated isogeny of $s_B$, while another isogeny algorithm isoex can generate the shared key j from the encryption key P and $s_B$, and the process of generating the shared key j can be seen in greater detail in FIG. 9. Function H can map shared key j into bitstrings, which can then be acted upon with an exclusive or operator to the message msg to return V. A ciphertext may be generated by concatenating U and V as shown by the equation ctxt:=(U, V). The decryption process may be found in FIG. 5D, where the same isogeny algorithm isoex can utilize the parameter U and the decryption key S to generate the same shared key j, which in turn may be used to decrypt the message msg from V.

FIG. 6A shows an example of pseudocode for an implementation of ciphertext compression in a SIKE public key encryption scheme for one message sent to one or more recipients. The code of FIG. 6A may be a SIKE analogue of the example of FIG. 4D. The difference may be that FIG. 6A shows an implementation of ciphertext compression for an isogeny-based encryption scheme as described in FIGS. 5B-5D. The difference between the process of FIG. 5C and FIG. 6A may be that there are a number of users k each receiving the message msg. The parameter U may be user agnostic (e.g., it does not depend on any parameters related to a particular user). As such, U may be reused for each user i of the k users. The parameter V may not be user agnostic (e.g., it depends on a parameter related to a particular user), so each user may have a different V. Following a similar process as in FIG. 5C, but instead having a plurality of encryption keys $P_i$, a multi-ciphertext mctxt:=(U, $V_0, \ldots, V_{k-1}$) can be generated. Each user i of the k users may use the process of FIG. 5D to decrypt a ciphertext (U, $V_i$) of the multi-ciphertext. By having one parameter U for all users, the size of the multi-ciphertext can be smaller by k·|U|, thus improving the efficiency of the computing device the algorithms are running on.

FIG. 6B shows an example of pseudocode for an implementation of ciphertext compression in a SIKE public key encryption scheme for one or more messages sent to one or more recipients. The example of FIG. 6B may be a multi-messaging analogue of the example of FIG. 6A. In FIG. 6B the single message msg of FIG. 6A may be replaced with a different message msg for each user i of the k users. Each user i may be able to decrypt the ciphertext (U, $V_i$) of the multi-ciphertext (U, $V_0, \ldots, V_{k-1}$). The security of the example in FIG. 6B may be greater than the security of the example in FIG. 5A.

FIGS. 12A-12C show examples of pseudocode for an implementation of a commutative supersingular isogeny Diffie-Hellman (cSIDH) public key encryption scheme. Further details regarding cSIDH schemes may be found in "CSIDH: An Efficient Post-Quantum Commutative Group Action" by Wouter Castryck, Tanja Lange, Chloe Martindale, Lorenz Panny, and Joost Renes; In Thomas Peyrin and Steven D. Galbraith, editors, Advances in Cryptology—ASIACRYPT 2018, pages 395-427. Springer International Publishing, 2018, which is incorporated by reference in its entirety. The algorithm may be based on an El Gamal scheme. Briefly, a cSIDH scheme may vary from a SIDH scheme (of which SIKE may be an implementation) in that a cSIDH scheme may be commutative while a SIDH scheme may not. Commutativity may be an invariance to the order that one or more actions are performed. For example, integer multiplication is commutative as shown by (2*3)*4=2*(3*4). An operation that is not commutative may be non-commutative. A cSIDH scheme may be based on a prime p. The prime may be a large prime (e.g., a prime number with a value greater than 1,000,000). The size of the prime (e.g., the bit-length) may define the security of the cSIDH scheme. The prime may be of the form $p=4 \cdot l_1 \cdot l_2 \ldots \cdot l_r - 1$, where h may be small, distinct odd primes. The prime p may define a set $S_p$, which may be chosen to be a subset of a finite field $F_p$ such that it contains all element A for which the elliptic curve equation $y^2 = x^3 + A \cdot x^2 + x$ has exactly p solutions. Another group G may arise from an ideal class group of Z[$\sqrt{-p}$], which may be denoted as Cl(O). Elements of the group may be called ideals and be represented by [a]. A commutative group action may then be defined such that Cl(O)×A←A, where A may be a set of all coefficients $A \in F_p$. This may mean that elements of the group Cl(O) can act on the elliptic curves via isogeny. This may permit secret conversion from one curve to another, similar to the case of SIDH. Such an operation may be denoted herein, including in FIGS. 12A-12D as [a]E.

In a setup phase, one or more parties to a key exchange (e.g., Alice and Bob) may agree on a large prime number p as described above and a starting elliptic curve $E_0$: $y^2 = x^3 + x$ over a finite field $F_p$ as well as an integer B. In a key generation phase such as that demonstrated in FIG. 12A, a first party (e.g., Alice) may sample the range [−B,B]=M, a n-tuple of integers sampled separately. The integers may represent an ideal class $[a] = (l_1^{e_1}, \ldots, l_n^{e_n}) \in Cl(0)$, where $l_i$ may be distinct prime ideals. A public key may be the coefficient $A \in F_p$ of the elliptic curve $[a]E_0$: $y^2 = x^3 + A \cdot x^2 + x$.

FIG. 12B shows example pseudocode of an encoding algorithm that may use the parameters generated in FIG.

12A. The algorithm Keygen may be the algorithm of FIG. 12A. The algorithm keygen may generate additional parameters U that do not depend on an encryption key of a user, be user agnostic, or both. The parameters [b] and $E_A$ may be generated in a same way as [a] and $E_A$ of FIG. 12A. The parameter $E_R$ may be a shared secret between the one or more parties. The parameter $E_R$ may be generated by the following: $[a][b]E_0=[b][a]E_0=E_R$. $E_R$ may be of the form $y^2=x^3+R\cdot x^2+x$, which may be the same for all parties (e.g., Alice and Bob) due to the commutativity of Cl(O). The exclusive or operation applied to a message and hash of the shared secret $E_R$ may be used to generate V. The concatenation of the parameters U and the encrypted message V may generate a ciphertext ctxt:=(U, V). The ciphertext may be decrypted as shown in FIG. 12C. Parameter $E_U$ may be generated in a similar way to parameter $E_A$.

FIG. 12D shows an example of pseudocode for an implementation of ciphertext compression for a single message sent to one or more recipients. The elements of FIG. 12D may be the same elements of FIG. 12B. Instead of a single recipient, the algorithm of FIG. 12D may be configured to send a same message msg to a plurality of users k. For each user i of the plurality of users k, a different $E_{Ai}$ may be generated from the $A_i$ encryption keys. The encryption scheme may continue as in FIG. 12B for each of the i users, thus generating k $V_i$ encrypted messages. In the same way as discussed elsewhere herein, the encrypted messages can be concatenated with parameters U that are user agnostic to generate a multi-ciphertext. The multi-ciphertext may be signed with a sanitizable signature as described elsewhere herein. The use of a multi-ciphertext scheme may improve the performance of a computer by reducing the operations related to class group action computation performed in the key generation and key exchange operations. The class group action operations may be the most computationally costly portion of the algorithm, and a multi-ciphertext scheme may perform key generation once, halving the computational cost of the algorithm. The multi-message multi-ciphertext scheme using a cSIDH scheme may be more secure than those based on a SIDH or lattice-based scheme. The multi-message multi-ciphertext scheme using a cSIDH scheme may be ciphertext indistinguishability (IND-CPA) secure.

FIG. 12D may also be implemented in a multi-message scheme. Instead of a single message msg for each of the i users of the plurality of users k, a plurality of messages $msg_i$ can be provided in operation 6. In this multi-message multi-ciphertext, each of the $V_i$ can comprise a different message.

Though described with respect to various encryption schemes herein, the methods and systems of generating and using multi-ciphertexts described herein are not limited to those particular encryption schemes. The methods and systems described herein may be resistant to chosen plaintext attacks (CPA). For example, an attacker with the ability to send a plurality of plaintexts to be encrypted and receive back the encrypted ciphertexts is not able to determine the secret key. The methods and systems described herein may be made resistant to chosen ciphertext attacks (CCA) by application of one or more generic transforms. The transforms may be adapted to handle multiple recipients at a time. The adapted transforms may be resilient to decryption failures. The adapted transformations may have security proofs in the quantum random oracle model (QROM).

Computer Systems

Figure 11:
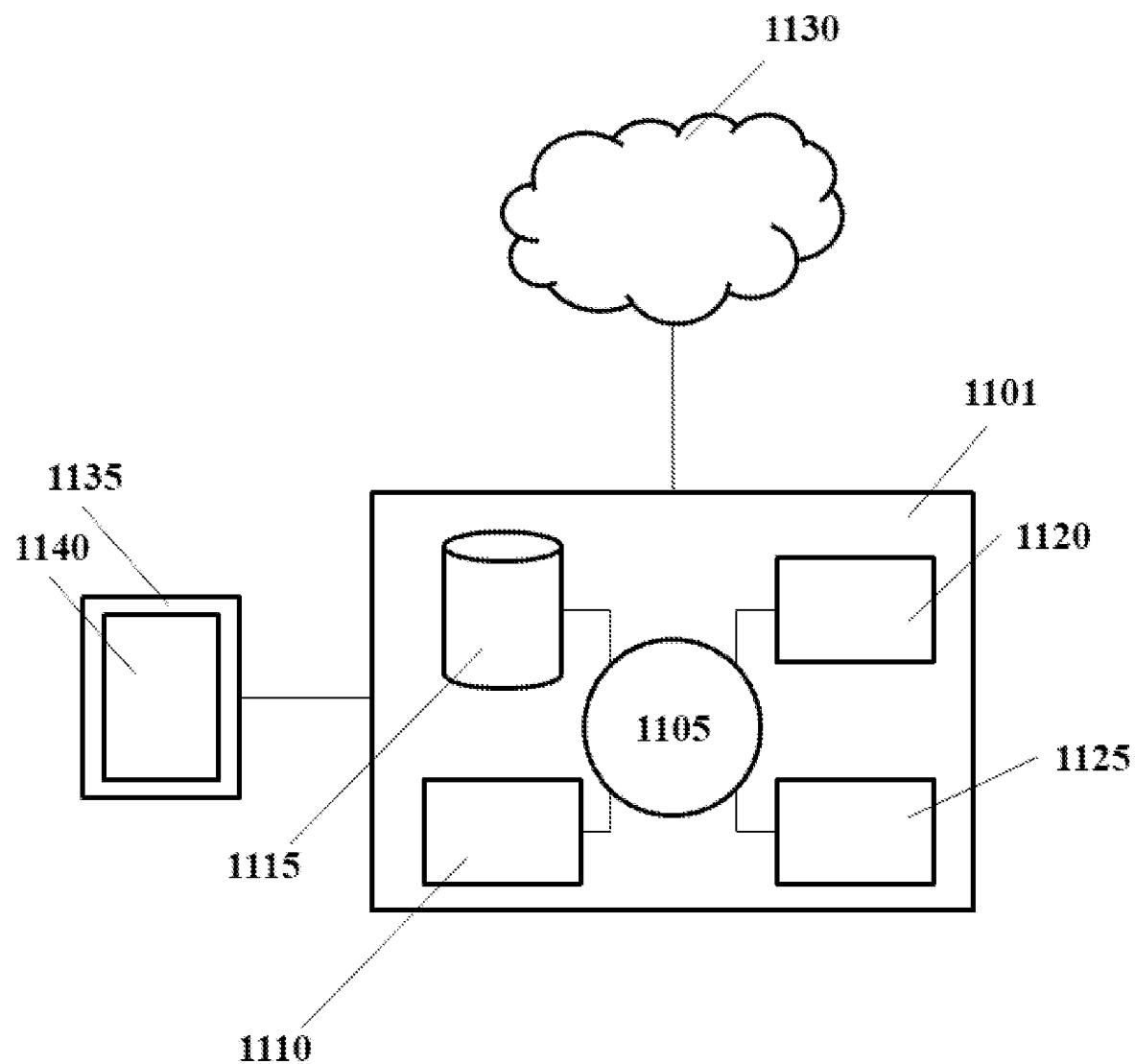
FIG. 11 shows a computer system that is programmed or otherwise configured to implement methods provided herein.

The present disclosure provides computer systems that are programmed to implement methods of the disclosure. FIG. 11 shows a computer system 1101 that is programmed or otherwise configured to implement methods described elsewhere herein. The computer system 1101 can regulate various aspects of the present disclosure, such as, for example, generating multi-ciphertexts, distributing messages/updates comprising multi-ciphertexts, etc. The computer system 1101 can be an electronic device of a user or a computer system that is remotely located with respect to the electronic device. The electronic device can be a mobile electronic device. The computer system 1101 may be a non-classical computer system (e.g., a quantum computer system)

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries, and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, programming interfaces. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105. The algorithm can, for example, implement one or more encryption algorithms as described herein.

EXAMPLES

The following examples are illustrative of certain systems and methods described herein and are not intended to be limiting.

Example 1—Real World Improvements in Update Sizes

Figure 7A:
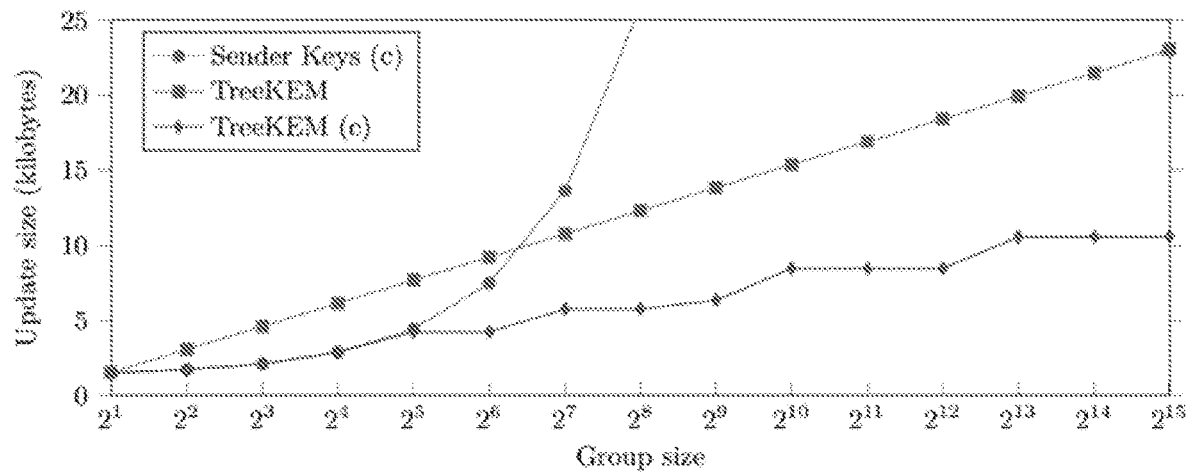
FIG. 7A shows a plot of the update size for a plurality of different scenarios using a Kyber-512 key encapsulation mechanism.
Figure 7B:
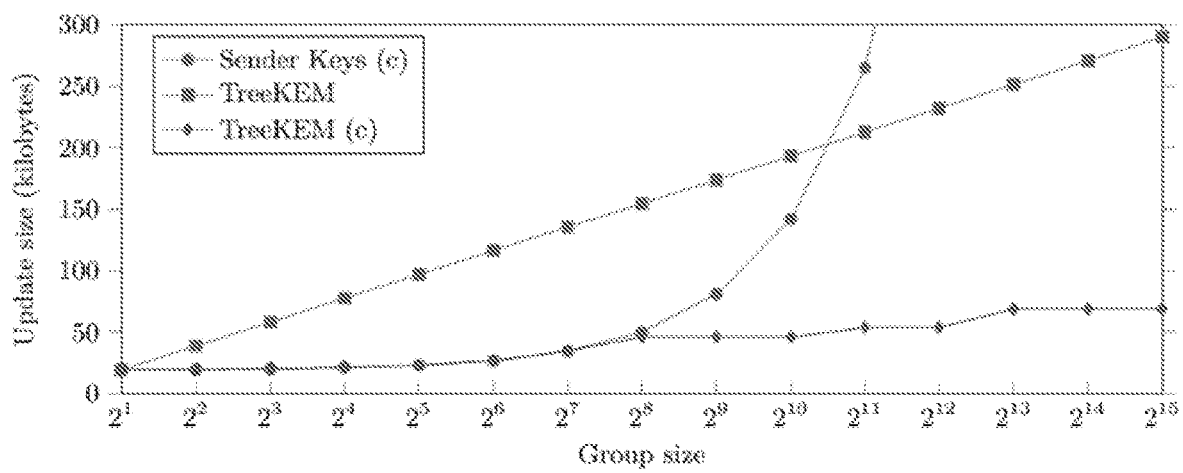
FIG. 7B shows a plot of the update size for a plurality of different scenarios using a FrodoKEM-640 key encapsulation mechanism.
Figures 7C, 8:
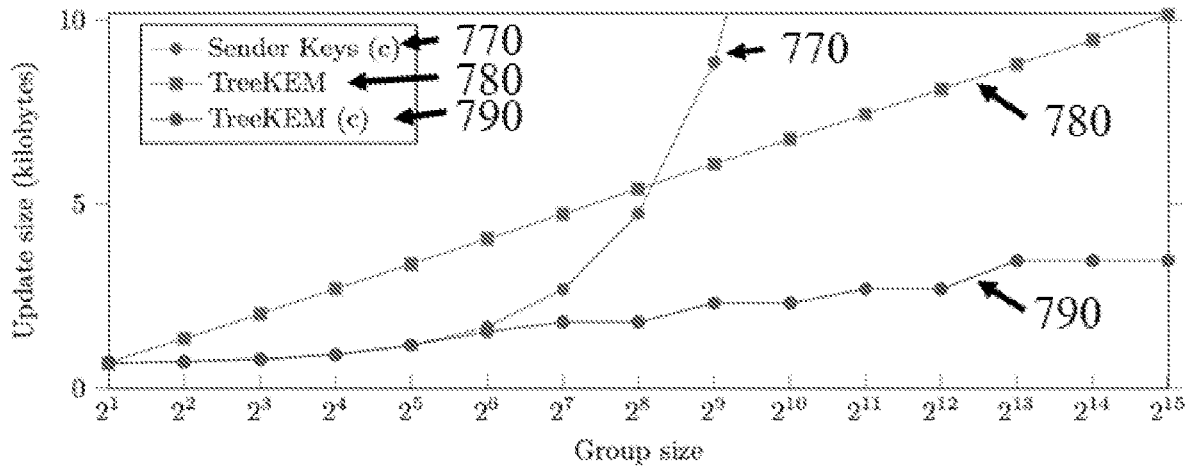
FIG. 7C shows a plot of the update size for a plurality of different scenarios using a SIKE/p434 key encapsulation mechanism.
FIG. 8 shows a table of efficiency improvements of using ciphertext compression methods and systems with various encryption schemes.

FIGS. 7A-7C show examples of update size versus group size plots for various key encapsulation mechanisms. The examples shown in FIGS. 7A-7C demonstrate the improvement of the function of a computer system that can be achieved via the implementation of methods and systems described elsewhere herein. For each group size shown in FIGS. 7A-7C, the arity of the tree was selected to minimize the update size. FIG. 7A shows a plot of the update size for a plurality of different scenarios using a Kyber-512 key encapsulation mechanism. The first line, Sender Keys (c), shows the update size as a function of group size for a sender keys scheme with compression applied, which can also be thought of as a compressed TreeKEM scheme with an arity equal to the group size, and thus a depth of 1, being used in the process 200 of FIG. 2. An example of a sender keys scheme can be found in FIG. 10C, where a single node transmits an update to each receiving node. The second line, TreeKEM, traces the efficiency of an uncompressed scheme such as that shown in FIG. 10D. While the initial cost of updating using the TreeKEM scheme is higher than that of a compressed sender keys scheme, as the group size increases the efficiency gains of using the TreeKEM scheme can be significant. Further improvements can be realized by applying a compressed TreeKEM (e.g., TreeKEM (c)) scheme as shown in the third line. The compressed TreeKEM scheme can be an implementation of the process 200 of FIG. 2, where a ciphertext compression is used in the update process. The compressed TreeKEM scheme shows improved performance over the standard TreeKEM scheme at all group sizes larger than 2, as well as showing marked improvement over compressed sender keys when group sizes grow beyond 64. As such, the ciphertext enabled compressed TreeKEM scheme can improve the update size, and thus the performance of systems using the updates, for all group sizes, with larger groups providing larger improvements.

Similarly, FIGS. 7B-7C show the improvement represented by using a ciphertext compression scheme in additional key encapsulation mechanisms (KEMs), showing the universality of the improvements. FIG. 7B is the plot for the FrodoKEM-640 KEM, while FIG. 7C shows the update size versus group size for the SIKE/p434 KEM. The callouts 770, 780, and 790 of FIG. 7C are present to clarify the legend for the figure. In each figure, the compressed TreeKEM scheme always performs better than the uncompressed TreeKEM scheme and performs better than the compressed sender keys scheme at larger group sizes. The location of the divergence between the compressed sender keys scheme and the compressed TreeKEM scheme can depend on the relative size of the system parameters, ciphertexts, and multi-ciphertexts for each scheme. For example, FrodoKEM-640 can have a proportionally larger system parameter byte size as compared to the byte size of the ciphertext than SIKE/p434, so it takes a larger group size to see the divergence between compressed sender keys and compressed TreeKEM.

FIG. 8 shows the asymptotic gain factors possible for a plurality of different KEM schemes when multi-ciphertext schemes are used. The |U| values can be the system parameters (e.g., parameters that do not depend on a public key of a user). The |U| values can correspond to the size of parameter U in FIGS. 4A-4D and 5A-5D. The use of the multi ciphertext scheme can reduce the number of times that these parameters are transferred, and thus the amount of data that may be transferred. The |V| values can be the size of the parameters that do depend on a public key of a user (e.g., the encrypted message, various other keys). By combining the |U| and |V| sizes the |ctxt| column can be generated, which shows the size of a full classical ciphertext. By reusing the |U| parameters and instead appending additional |V| parameters, the size of a two recipient multi-ciphertext can be |U|+2|V|, while a two-recipient classical ciphertext can be 2|U|+2|V|. By computing |ctxt|/|V|, the asymptotic gain factor can be determined, which can show the maximum efficiency factor that can be gained by implementing multi-ciphertext methods and systems as described elsewhere herein. As seen in FIG. 8, the methods described herein can impart real efficiency gains to computer systems by decreasing, for example, the communication bandwidth requirements for sending an encryption key update. Further, FIG. 8 can demonstrate the wide-ranging applicability of multi-ciphertext schemes to a variety of different encryption schemes.

Example 2—Interplay of Database Structures and Ciphertext Compression

Figure 10A:
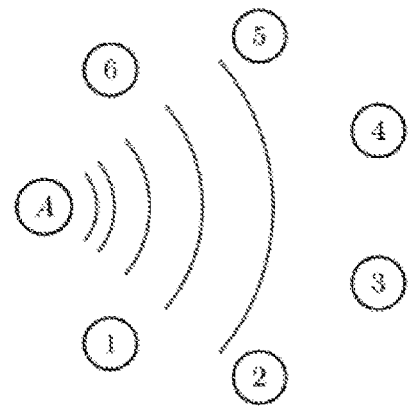
FIGS. 10A-10E shows a plurality of protocols that may be used in conjunction with ciphertext compression.
Figure 10B:
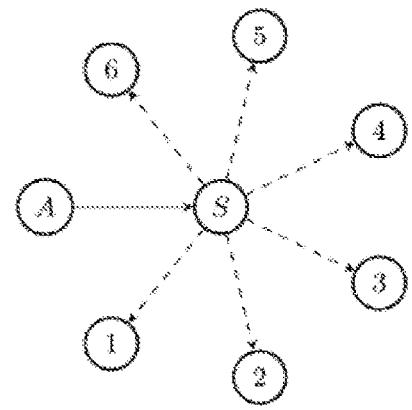

FIGS. 10A-10E show examples of a plurality of protocols that may be used in conjunction with ciphertext compression. FIG. 10A is an example of a broadcast use case. In a broadcast use case, a user A can output information to one or more recipients, 6 in this example. If the information is sensitive, it can be important to A to have some encryption on the information. The output can be over a network (e.g., over the internet), over a broadcast medium (e.g., light waves, radio waves), or the like. FIG. 10B shows a server aided messaging scheme. A user A has a message intended for one or more other users that A sends to a server S. Because the one or more users may not be online at the time user A sends the message, the message may be sent to the server S that is always online. In this example, the amount of data to be transmitted can grow quickly based on the number of intended recipients of the message. Using a multi-ciphertext can reduce the load leaving the server S. In the example of 6 recipients, if user A sent a 1 megabyte (MB) message comprising 0.5 MB of system parameters that are user agnostic and 0.5 MB of encrypted message that is not user agnostic, a standard ciphertext system has A send 6 MB of information to the server (6 users×1 MB per message), and the server then sends out six 6 MB messages (as any changes to the user's message can compromise the signature). In the case of a multi-ciphertext system, user A sends a 3.5 MB message to the server (0.5 MB of system parameters and 3 MB of encrypted messages), and the server can update each of the recipients with a 6 MB message, for a total communication savings of 2.5 MB. In the case of using sanitizable signatures in conjunction with a multi-ciphertext scheme, user A can send a 3.5 MB message to the server, and the server can remove the information that is not intended for each user of the plurality of users, which permits sending six 1 MB messages for a total communication savings of 32.5 MB. As is evident, the combination of multi-ciphertexts and sanitizable signatures can generate significant reductions in the bandwidth required to send messages.

Figure 10C:
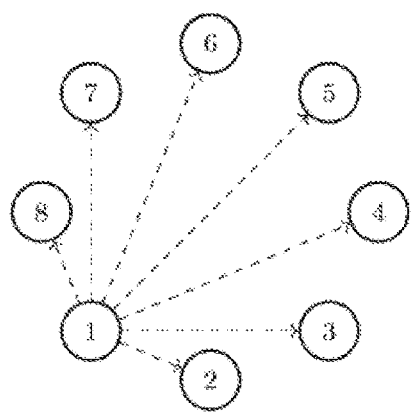
Figure 10D:
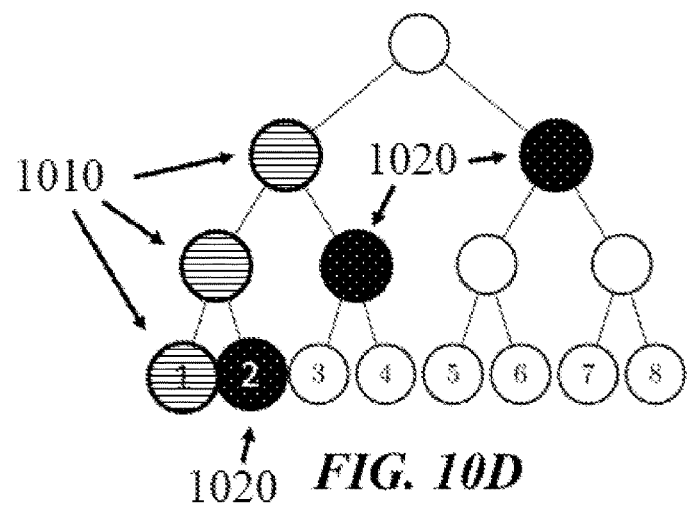
Figure 10E:
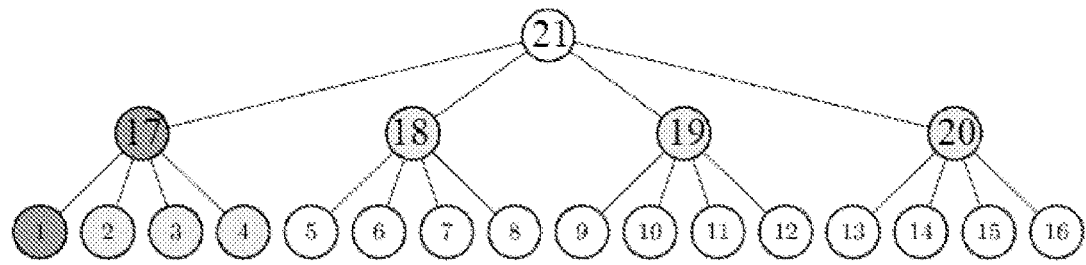

FIGS. 10C-10E can be seen as different tree structures compatible with multi-ciphertexts and sanitizable signatures. FIG. 10C is an example of a sender keys scheme, where a user updating their encryption key sends the update to each other user of the group. This structure is a tree of arity N, where N is the number of members of the group. This can be contrasted with the tree of FIG. 10D, which instead has the same number of recipient nodes, but is instead arranged in a tree of arity 2. When a user sends a message, such as an encryption key update, in a sender keys scheme, the user sends N−1 messages, 7 in the example of FIG. 10C. For the tree of FIG. 10D, each node can know the decryption keys of nodes in its path (e.g., the path to node 1 are the nodes 1010). Since each node can know the decryption keys in the path of the node, a user updating their keys updates all nodes in the path of the user, as which in turn requires sending updates to nodes in the co-path. In the example of FIG. 10D, for node 1, that is nodes 1010 for the path and nodes 1020 for the co-path. This leads to sending d public keys and d ciphertexts, where d=$\log_2 N$. As such, a tree structure is more scalable than sender keys structure, as the communications cost scales as $\log_m N$ versus N−1.

FIG. 10E is an example of a higher arity tree structure with arity 4 enabled by using a multi-ciphertext scheme. Similar to the tree of FIG. 10D, each node knows the decryption keys of the nodes in its path, so when user 1 sends an update, they send d encryption keys where d=$\log_4 N$ (=2 in this example) and (m−1)*d (where m is the number of users, and (m−1)*d=6 in this example) multi-ciphertexts. The number of multi-ciphertexts sent can be 1 per level. The multi-ciphertext may comprise (m−1) ciphertexts to update the (m−1) other nodes per level. In the example of FIG. 10D, an first multi-ciphertext update from node 1 can comprise ciphertexts for nodes 2, 3, and 4, and a second multi-ciphertext update can comprise ciphertexts for nodes 18, 19, and 20. The multi-ciphertext can also be signed with a sanitizable signature that enables the multi-ciphertext to be modified before it is sent to each recipient node. For example, the multi-ciphertext update for nodes 2, 3, and 4 can be modified to contain the relevant updates, and not the updates for the other two nodes.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A computer-implemented method for transmitting a ciphertext comprising a plurality of encrypted parts to a plurality of users, comprising:
   (a) providing a common set of system parameters for said plurality of users, which common set of system parameters includes a first parameter from a first probability distribution function;
   (b) generating said plurality of encrypted parts by encrypting a plaintext using parameters unique to each user of said plurality of users that comprise respective public keys of the plurality of users and second parameters from a second probability distribution function, wherein the encrypted parts are encrypted using a lattice-based encryption scheme;
   (c) generating said ciphertext comprising a part derived from said common set of system parameters and said plurality of encrypted parts; and
   (d) transmitting said ciphertext to said plurality of users, wherein said ciphertext is decryptable at least in part using said parameters unique to each user of said plurality of users.

2. The method of claim 1, wherein said common set of system parameters is generated using a seed and a pseudo-random number generator.

3. The method of claim 1, wherein at least a parameter of said parameters unique to each user of said plurality of users is generated using a seed and a pseudo-random number generator.

4. The method of claim 1, wherein said common set of system parameters or said parameters unique to each user of said plurality of users comprise non-square matrices.

5. The method of claim 1, further comprising:
   (a) generating a system parameter set comprising said common set of system parameters, wherein said system parameter set comprises parameters that do not depend on the public keys of said plurality of users; and
   (b) generating a fixed component that is the part derived from said common set of system parameters based at least in part on said system parameter set; wherein said ciphertext is decryptable at least in part using said fixed component.

6. The method of claim 5, wherein said encryption is based on a Lindner-Peikert scheme.

7. The method of claim 1, further comprising organizing a database, organizing the database comprising:
   structuring a plurality of recipients in a tree structure of arity m, wherein 'm' is at least two, wherein:
   transmitting said ciphertext to said plurality of users comprises transmitting the ciphertext to less than all of said plurality of recipients.

8. The method of claim 7, wherein said arity m is at least about 8.

9. The method of claim 7, wherein said arity m is from about 8 to about 16.

10. The method of claim 7, wherein a number of bytes used for said transmitting is about a factor of at least two lower than a number of bytes for transmitting an update to each of said plurality of recipients.

11. The method of claim 7, wherein said transmitting comprises transmitting a same message to each node of said tree structure.

12. The method of claim 11, wherein said same message comprises update information of an encryption key of a user of said database.

13. A system comprising one or more computer processors and computer memory coupled thereto, wherein the computer memory comprises machine executable code that, upon execution by the one or more computer processors, implements a method for transmitting a ciphertext comprising a plurality of encrypted parts to a plurality of users, the method comprising:
   (a) providing a common set of system parameters for said plurality of users, which common set of parameters includes a first parameter from a first probability distribution function;
   (b) generating said plurality of encrypted parts by encrypting a plaintext using respective public keys of the plurality of users and second parameters from a second probability distribution function, wherein the encrypted parts are encrypted using a lattice-based encryption scheme;
   (c) generating said ciphertext comprising a part derived from said common set of system parameters and said plurality of encrypted parts; and
   (d) transmitting said ciphertext to said plurality of users, wherein said ciphertext is decryptable at least in part using said parameters unique to each user of said plurality of users.

* * * * *